United States Patent [19]

Schomaker et al.

[11] Patent Number: 5,593,527
[45] Date of Patent: Jan. 14, 1997

[54] DOUBLE JACKETED FIRE HOSE AND A METHOD FOR MAKING A DOUBLE JACKETED FIRE HOSE

[75] Inventors: Josef B. Schomaker, Edinboro; Michael Kirjk, Jr., Union City; Donald A. Ruffcorn, Erie, all of Pa.

[73] Assignee: Snap-Tite, Inc., Union City, Pa.

[21] Appl. No.: 440,683

[22] Filed: May 15, 1995

Related U.S. Application Data

[62] Division of Ser. No. 100,048, Jul. 30, 1993, abandoned.

[51] Int. Cl.⁶ .............. B29C 47/02; F16L 11/02; F16L 11/08; F16L 11/20
[52] U.S. Cl. .......... 156/149; 156/229; 156/244.12; 156/287; 156/294; 138/125; 138/141
[58] Field of Search ..................... 156/149, 165, 156/229, 294.12, 287, 294; 138/141, 124, 125, 153, DIG. 7

[56] References Cited

U.S. PATENT DOCUMENTS

| | | | |
|---|---|---|---|
| 2,984,870 | 5/1961 | Warnken | 156/165 |
| 2,990,577 | 7/1961 | Laubarede | 156/137 |
| 3,143,451 | 8/1964 | Pratt | 156/229 |
| 3,194,273 | 7/1965 | Laubarede | 156/229 |
| 3,489,631 | 1/1970 | Chen | 156/149 |
| 3,725,167 | 4/1973 | Love | 156/149 |
| 3,755,032 | 8/1973 | Higbee | 156/149 |
| 3,869,304 | 3/1975 | Bogulslawski | 264/174 |
| 3,927,164 | 12/1975 | Shimabukuro | 156/287 |
| 4,130,139 | 12/1978 | Haren | 156/149 |
| 4,604,155 | 8/1986 | Mckiernan | 156/149 |
| 4,738,735 | 4/1988 | Joncker | 156/149 |
| 5,273,080 | 12/1993 | Morohashi | 138/124 |

*Primary Examiner*—Daniel Stemmer
*Attorney, Agent, or Firm*—Woodling, Krost & Rust

[57] ABSTRACT

A method for manufacturing a double jacketed fire hose, and a double jacketed fire hose comprising an inner jacket and an outer jacket, said inner jacket being encapsulated with polyurethane, said inner jacket residing within said outer jacket, said inner and outer jacket having a controlled net twist.

21 Claims, 9 Drawing Sheets

DOUBLE JACKETED FIRE HOSE AND A METHOD FOR MAKING A DOUBLE JACKETED FIRE HOSE

This is a divisional of application Ser. No. 08/100,048 filed on Jul. 30, 1993, now abandoned.

FIELD OF THE INVENTION

This invention relates to a double jacketed fire hose. Double jacketed fire hoses are used in those applications requiring a heavy duty hose. For instance, a double jacketed fire hose is used in the field by firemen where the outer jacket is subjected to being scraped and dragged along the ground and other surfaces.

Double jacketed fire hoses are used in municipal fire fighting efforts. In addition, double jacketed fire hoses are used in those applications requiring extra strong fire hoses. In the double jacketed construction of the present invention, the outer jacket provides additional strength to the hose. Double jacketed fire hoses are used in various sizes depending upon the particular need.

BACKGROUND OF THE INVENTION

Several other double jacketed fire hoses are presently on the market. One of the traditional constructions of a double jacketed fire hose includes: extruding a polyurethane liner or tube; applying a heat activated adhesive to the outer surface of the tube or liner; inserting the tube or liner with the adhesive applied thereto into a woven jacket; inflating the inner tube or liner with steam to cure the adhesive and attach the liner or tube to the jacket, and, finally, inserting the inner jacket into the outer jacket. This method produces a double jacketed hose which has some unfavorable characteristics. Specifically, this method produces hoses whose liners or tubes become loose resulting in useless hoses. The inner liners or tubes detach from the jacket when the adhesive deteriorates.

Additionally, some of the adhesives used in the aforestated process must be used very quickly after the application of the adhesive to the inner jacket, or liner or tube. This makes the manufacturing process very cumbersome.

Another process developed in this industry is covered by a United States Patent issued to Joncker, et al., U.S. Pat. No. 4,738,735. The Joncker, et al. patent is directed to a method for continuously extruding an elastomeric material on the interior of a continuous tubular woven fabric in a loom. In this process the liner is applied as a hot melt coating at the weaving point in the loom. The extruder or coater is mounted directly over the loom and as the jacket is woven the extruder or coater leaves or applies a layer of hot melted urethane directly on the interior of the inner jacket created by the weaving.

The inner jacket created by the Joncker process is then inserted into an outer jacket. This double jacketed hose wherein the inner jacket has been coated by the Joncker process has performed unsatisfactorily. There are several reasons why hoses produced using the Joncker process are unsatisfactory. First, the inner jacket produced by the Joncker process is not untwisted. Second, the inner jacket produced by the Joncker process does not fit snugly within the outer jacket. Third, the inner jacket produced by the Joncker process is not sized so as to fit precisely within the inner diameter of the outer jacket. Fourth and finally, the fibers of the inner jacket produced by the Joncker process continue to stretch after repeated high-low pressure fluctuations in service causing the bunching up of the inner jacket inside the outer jacket.

The double jacketed hoses produced by either the traditional method and/or the Joncker process bunch up and/or kink. Put another way, they do dot perform as one unified hose or assembly rendering the hoses relatively inefficient over time. Specifically, it is well known in the art, that a natural twist exists by virtue of the manufacturing process and equipment which produce woven jackets. This natural twist will be described in greater detail hereinbelow. The traditional method employing an extruded tube or liner is insufficient in that the adhesive deteriorates permitting separation of the liner from the woven jacket. Another reason for the separation of the tube from the woven jacket is the aforestated twist which exists in the woven jacket.

The double jacketed hoses produced employing the Joncker process to manufacture the inner jacket are unsatisfactory because the twist imparted to the inner jacket produced by said process is not controlled or removed from the inner jacket when it is inserted into the outer jacket. These hoses, when pressurized, severely twist. The inner jacket produced by the Joncker process rotates within the outer jacket which, under certain conditions, can completely obstruct the flow of water. Additionally, hoses having large amounts of twist result in loose fittings and/or disconnections. Fittings are used where two hoses are joined together at a union or where a hose is connected to a fire plug. Additionally, in the situation where the hose is being held or supported by a fireman he can be subjected to injury.

OBJECTS AND SUMMARY OF THE INVENTION

It is an object of the present invention to provide a double jacketed fire hose which offers a minimal amount of resistance to the flow of water within the inner jacket of the hose. Specifically, this is accomplished by providing a smooth layer of polyurethane on the interior of the inner jacket of the double jacketed construction.

It is a further object of the present invention to provide a double jacketed fire hose that has a net twist which can be controlled. Specifically, it is well known in the art that a woven hose has a natural twist by virtue of its manufacture. The present invention provides a method whereby the twist of the inner jacket is controlled so as to counteract the twist of the outer jacket such that the net twist is small, or, if desired, does not exist.

It is a further object of the present invention to provide a double jacketed fire hose whose inner jacket does not bunch up or kink or otherwise become deformed so as to maintain the efficient flow of water. This is accomplished by controlling the twist of the inner jacket with respect to the outer jacket and, further, it is accomplished by a normalizing process which will be described in further detail hereinbelow. It is a further object of the present invention to provide a double jacketed fire hose whose inner jacket fits snugly within the outer jacket. Additionally, it is an object of the present invention to provide a double jacketed fire hose which acts as a cohesive single hose rather than a hose within a hose.

It is a further object of the present invention to provide a double jacketed fire hose whose inner jacket is completely encapsulated with polyurethane after first being heated and dried. This complete encapsulation, in combination with the normalization and untwisting, produce a double jacketed fire hose which performs, in effect, as a unified single hose.

It is a further object of the present invention to provide a means by which the inner jacket, completely encapsulated with polyurethane or similar thermoplastic material, may expand radially to the inside diameter of the outer jacket under the influence of heat and pressure.

It is a further object of the present invention to provide a method for manufacturing a double jacketed fire hose which has the aforestated characteristics at a reasonable cost. The present invention also provides a method which is relatively simple to execute.

It is a further object of the present invention to provide a double jacketed hose which has sufficient flexibility so as to minimize the packing volume.

It is a further object of the present invention to provide a double jacketed fire hose, which, by employing a combination of various manufacturing methods, material, and equipment described below, will result in a fire hose with superior characteristics including handling, flow (low friction loss), controlled twist, controlled expansion and elongation (to minimize snaking) and very high kink resistance. The aforementioned characteristics are important attributes to aid firefighters in real fire ground (fire fighting) conditions.

BRIEF DESCRIPTION OF THE DRAWINGS

The structure, operation and advantages of the preferred embodiment of the invention will become further apparent upon consideration of the following description taken in conjunction with the accompanying drawings, wherein:

FIG. 1 illustrates the untwisting pilot, the first drive means for pulling the inner jacket over the untwisting pilot and the first clamping station and into the first reservoir, the second drive means for pulling the inner jacket through the second clamping station and into the second reservoir, the third drive means for pulling the inner jacket through the heating and drying means, the cross-head extruding die, wiper and mandrel assembly and the cooling tank;

FIG. 2 also illustrates a mark positioned on the fabric before and after the fabric passes over the untwisting pilot;

FIG. 4 also shows the inner jacket passing through the cross-head extruding die and the various passageways in which the polyurethane flows;

FIG. 5 also illustrates the warp and weft fibers;

FIG. 6 further illustrates the complete encapsulation of the inner jacket with polyurethane; FIG. 6 is taken along line 6—6 as shown in FIG. 1, a schematic shown with mandrel 14, the perforated mandrel; FIG. 6 is representative of the inner jacket 1 with polyurethane applied thereto using mandrel 30 and wiper 42.

DETAILED DESCRIPTION OF THE INVENTION

Figure 1:
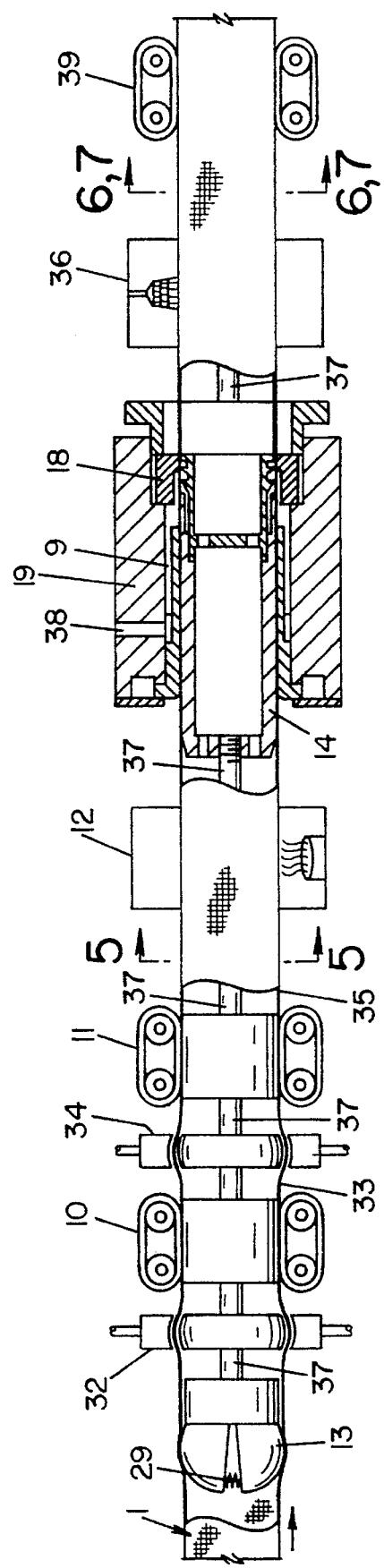
FIG. 1 is a schematic illustration of the extrusion process and the equipment used therefor.

The double jacketed fire hose 28 is comprised of inner jacket 1 and an outer jacket 2. The inner jacket 1 is comprised of warp fibers 3 and weft fibers 4. The warp fibers run longitudinally with respect to the completed inner jacket. The weft fibers 4 run helically along the completed inner jacket. Similarly, the outer jacket 2 also has warp and weft fibers. The inner and outer jackets are woven on a loom. The loom naturally imparts a twist to the inner and outer jackets. The twist imparted to a jacket woven on a loom is similar to the twist imparted to a metal helical spring. For instance, if a metal helical spring is secured at one end vertically above the ground, and a weight is attached to the free end of the spring, the weight has the effect of extending the length of the spring and also has the effect of untwisting the spring as the weight elongates the spring toward the earth.

In a similar fashion, depending upon the direction of the weave of the jacket under consideration, a twist is imparted to the jacket. Considering, for example, a single jacket construction, a twist exists in the direction of the weft fibers. The direction of the twist is dependent upon the rotational direction of the weft fibers when the jacket is manufactured. Once the jacket is completed and pressurized the jacket acts as the spring does when the weight was applied to the spring. Specifically, the jacket rotates upon pressurization and elongates.

Figure 10:
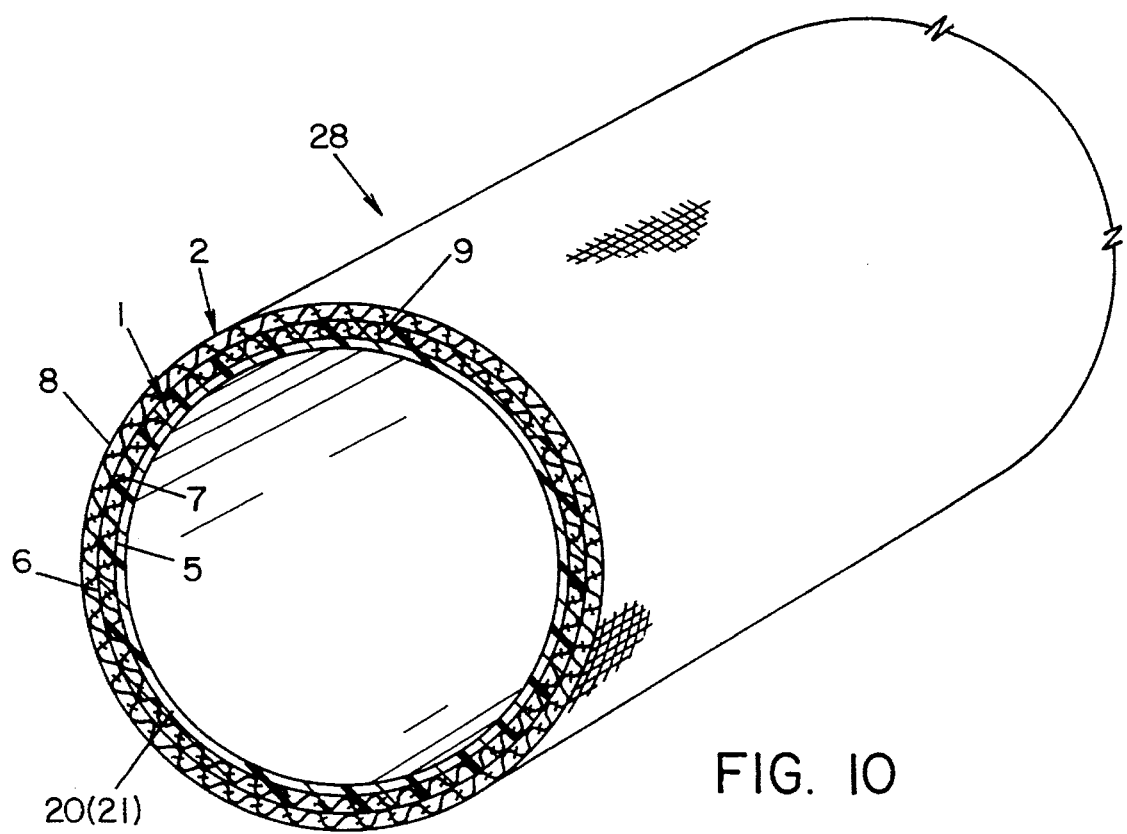
FIG. 10 is a cross-sectional view of the inner jacket inside the outer jacket after normalization illustrating no gap between the inner jacket and the outer jacket.

The invention disclosed herein is directed toward a double jacketed fire hose and a method for making the double jacketed fire hose. The double jacketed fire hose is unique in construction in that the inner jacket 1 resides substantially in engagement with the outer jacket 2. The inner and outer jackets act substantially as one unified construction or, put another way, a single hose. It is well known in the art that it is very difficult to fit or control the inner jacket with respect to the outer jacket. It is difficult to control the flat width of a woven fabric hose in that the loom machinery provides differing amounts of tension depending upon the rotational speed of the weft spools which supply the loom. This results in jackets whose flat widths can vary by as much as ± two millimeters (0.080"). This variation or tolerance makes it nearly impossible to fit the inner jacket snugly, ie. no air gap, to the outer jacket. This same difficulty is apparent in the situation as previously described with respect to the traditional method wherein a tube or liner made from polyurethane is used as distinguished from a woven inner jacket. FIG. 10 shows the inner jacket 1 in engagement with the outer jacket 2.

The manufacturing process of the double jacketed hose of the instant invention is now described. The inner jacket is first constructed by a loom. The inner jacket is then untwisted, heated and dried, coated and encapsulated with polyurethane, and then is moved to another processing station. Other thermoplastic materials can be used in place of polyurethane.

The processes as described herein are employed on hoses ranging in size from one to five inches in diameter. However, the processes could be employed on hoses having a larger or smaller diameter. The process involves encapsulating a woven inner jacket with polyurethane through an extrusion process which applies a layer of polyurethane on the exterior or interior of the inner jacket. The inner jacket is then inserted into a woven outer jacket and normalized.

Figure 3:
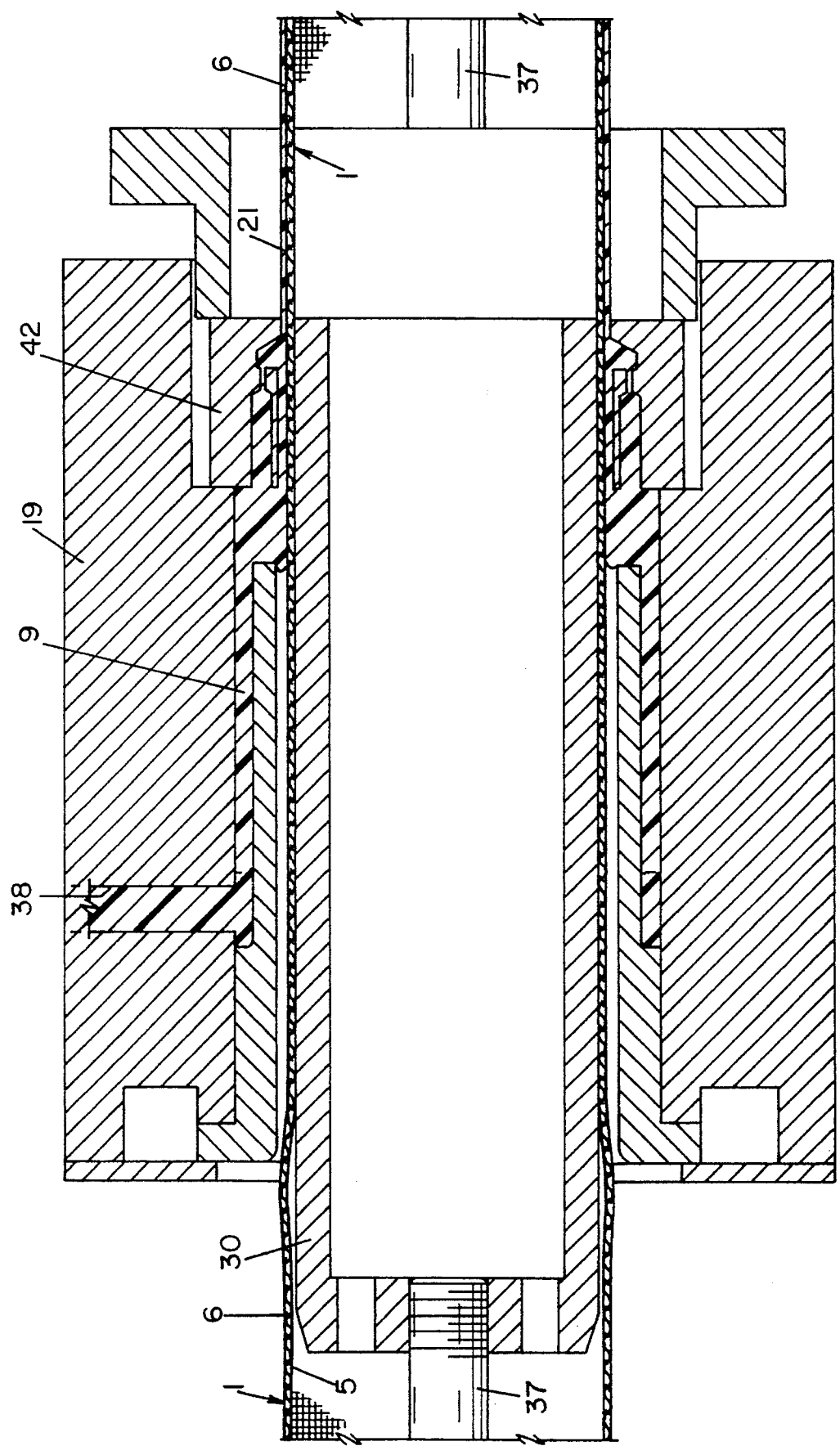
FIG. 3 is a sectional view of the pipe-like mandrel, the cross head extruding die, and the wiper for use in applying a layer of polyurethane onto the exterior of the inner jacket.

Hoses whose diameters are two inches or smaller are manufactured, using the preferred embodiment of the process, by extruding a layer of polyurethane onto the exterior of the woven jacket as well as into and through the inner jacket followed by reversal of the inner jacket. FIG. 3 illustrates pipe-like mandrel 30 and wiper 42 used to apply an exterior layer of polyurethane to the inner jacket. Polyurethane 9 is supplied through passageway 38 in the die. The polyurethane 9 passes, in part, through the wiper 42 as it is applied to the inner jacket. The inner jacket is reversed and then inserted into a woven outer jacket and normalized. This is done so as to maintain the flexibility of the double jacketed hose. The flexibility of the double jacketed hose is important because it enables packing in a relatively small volume and positively influences overall handling characteristics.

Figure 4:
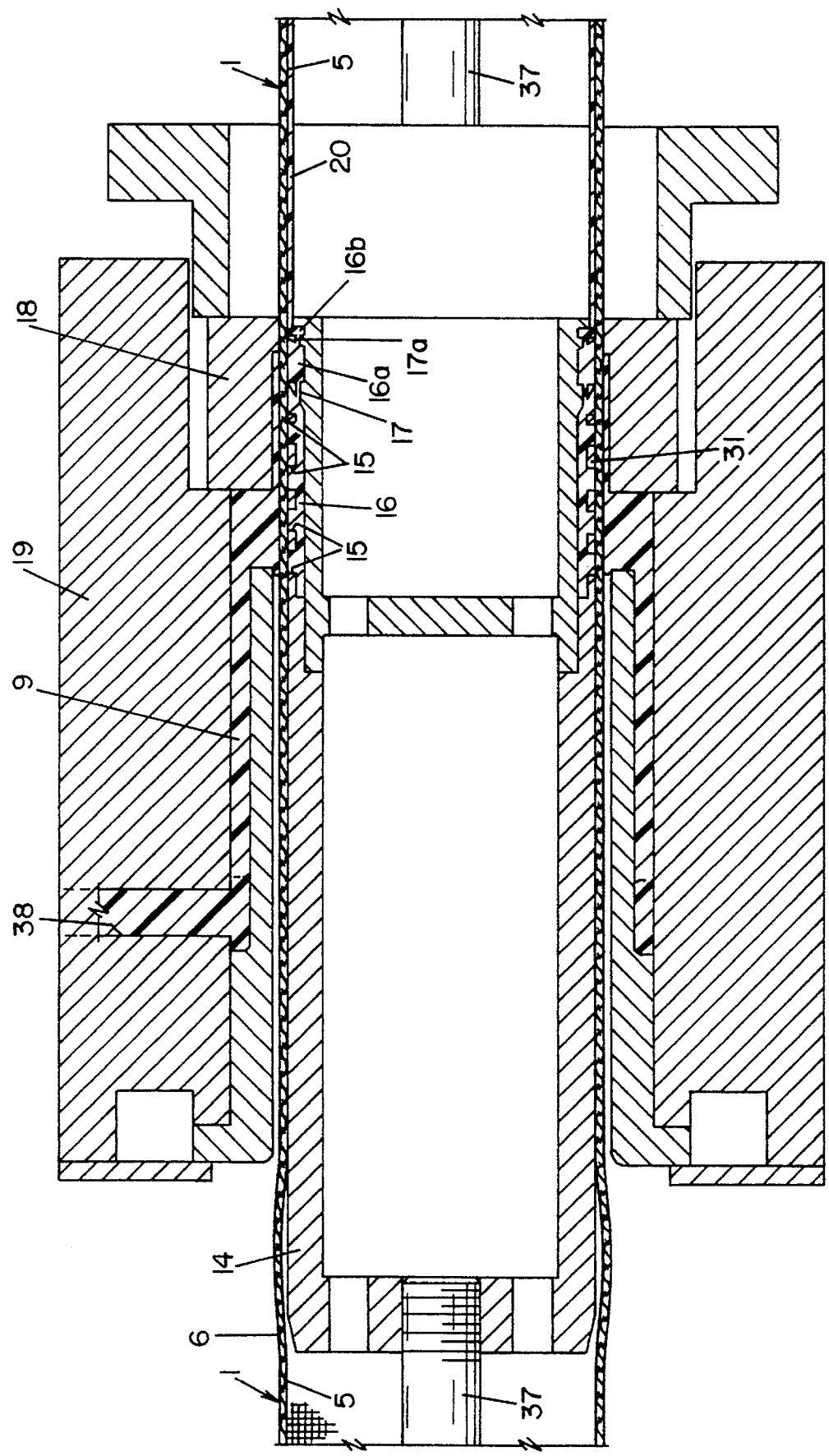
FIG. 4 is a sectional view of the cross head extruding die, and the mandrel and the wiper for use in applying a layer of polyurethane on to the interior of the inner jacket.
Figure 5:
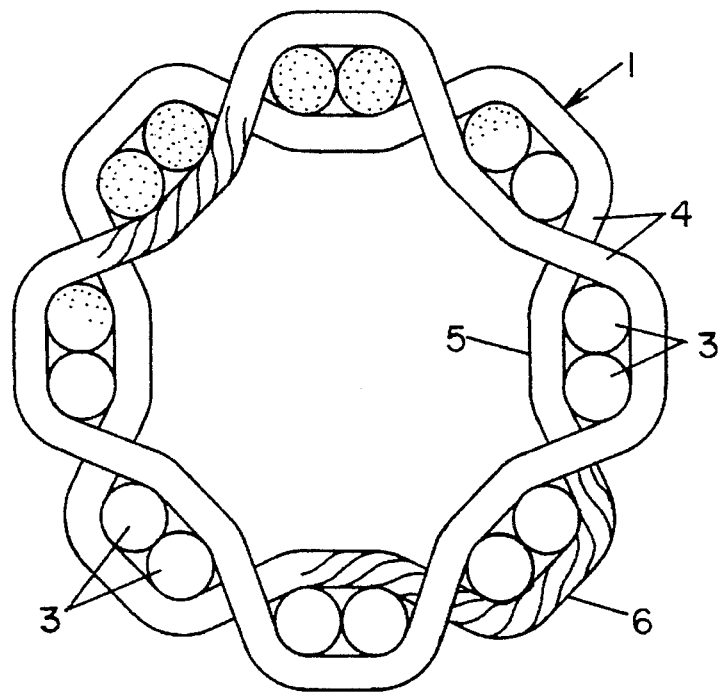
FIG. 5 is a sectional view of the fabric prior to the application of the polyurethane.

Hoses whose diameters are larger than two inches are manufactured, using the preferred embodiment of the process, by extruding a layer of polyurethane through the weave of the inner jacket and thus forming a layer of polyurethane on the interior of the woven jacket. FIG. 4 illustrates the mandrel 14 and wiper 18 used to apply an interior layer of polyurethane to the inner jacket. Polyurethane 9 is supplied through passageway 38 in the die. The polyurethane 9 passes through the inner jacket, apertures 15, chambers 16, 16a, 16b and passageways 17 and 17a applying a layer of polyurethane to the inner jacket.

FIG. 1 is a schematic of the extrusion process. The untwisting pilot 13, the first and second clamping stations 32 and 34 and the mandrel are all affixed to one another by interconnecting rod 37. One clamping station is in its clamped state at all times. When first drive means 10 pulls the inner jacket 1 over the pilot 13 and through the first clamping station 32, the second clamping station is in the clamped state. The first reservoir 33 then collects a sufficient length of inner jacket 1. The first clamping station 32 is then clamped and the second clamping station 34 is unclamped permitting the second drive means 11 to pull the inner jacket 1 through the second clamping station 34, collecting the inner jacket in second reservoir 35. Meanwhile, the third drive means 39 continuously pulls the inner jacket 1 over the mandrel, die and wiper assembly where polyurethane 9 is extruded onto, into and through the inner jacket 1. See, FIG. 1.

The interconnecting rod 37 and the clamping stations maintain the position of the pilot 13 and mandrel at all times. The first and second drive means and first and second clamping stations are controlled and sequenced. In this manner, a continuous supply of the inner jacket 1 is available to the extruding process.

Figure 2:
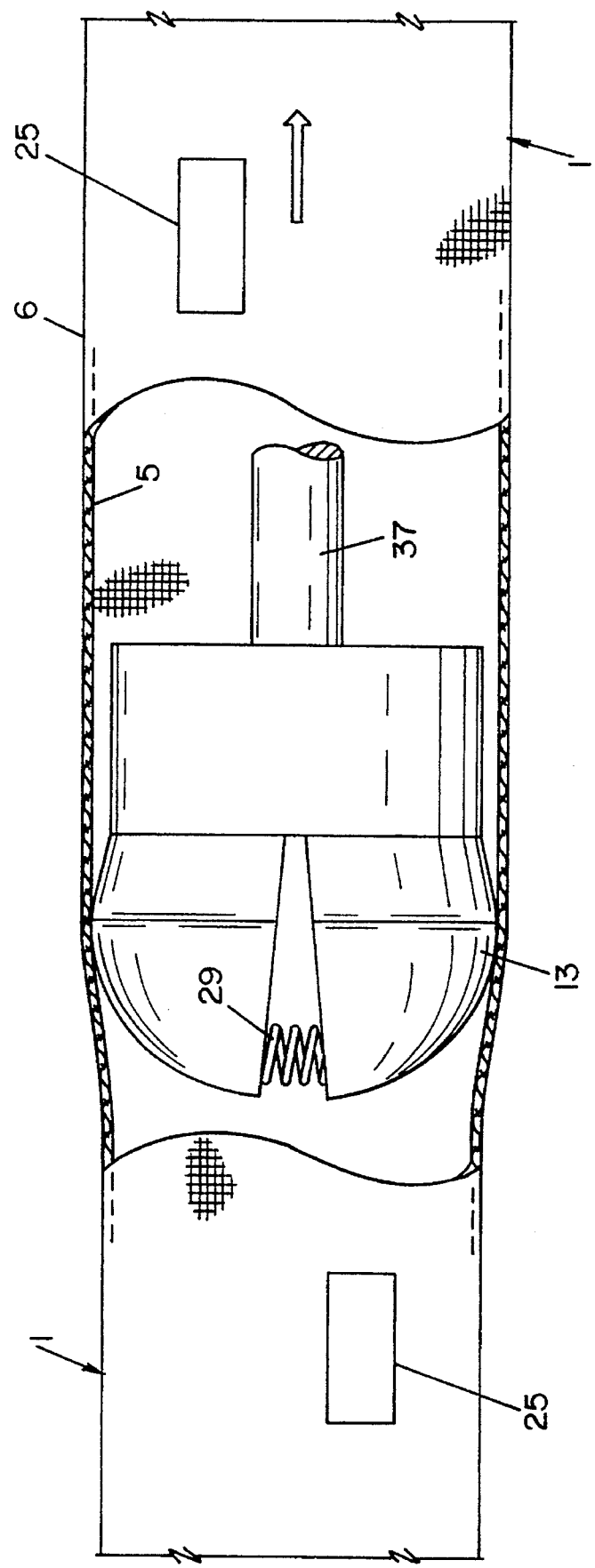
FIG. 2 is an illustration showing the inner jacket proceeding over the untwisting pilot.

The first step of the process is the untwisting step. In the untwisting step, the inner jacket 1 is drawn over a spring loaded spherically shaped pilot and through the first clamping station 32, which is necessarily unclamped, under the tension of a first drive means 10. The untwisting pilot is shown in FIG. 1 and in FIG. 2 in more detail. The untwisting pilot 13 simulates the application of pressure within the inner jacket 1. This simulation of pressure untwists the inner jacket 1. FIG. 2 illustrates a mark 25 on inner jacket 1 before the mark on the inner jacket reaches the pilot 13. The mark 25 is shown for purposes of illustration and is not a part of the physical construction of the inner jacket. The mark 25 is simply a mark created by applying a magic marker to the exterior surface of the inner jacket. When the inner jacket progresses over the pilot 13, a rotational untwisting takes place which causes the mark on the exterior 6 of the inner jacket 1 to rotationally move. Specifically, FIG. 2 illustrates a new position of the mark 25 after the inner jacket 1 has progressed over the pilot 13.

The amount of untwisting of the inner jacket 1 can be and is controlled. The untwisting is controlled by spring 29 in pilot 13. A larger spring force produces a larger amount of untwisting. Put another way, the spring force in pilot 13 regulates the untwisting. The control of the untwisting is necessary so as to effect the overall resultant twist of the double jacketed fire hose 28. The direction of the rotational twist is dependent upon the manufacture of the jacket on the loom. The direction of the rotational twist is either clockwise or counter clockwise. In the preferred embodiment the rotational direction of the twist of the inner jacket will be opposite to the direction of the rotational twist of the outer jacket. The inner jacket 1 is untwisted in a controlled amount with respect to the outer jacket 2 so as to produce a small resultant twist, or, if desired, no twist whatsoever. The control of the twist of a double jacketed fire hose is important to insure that the hose fittings do not become loose and/or disconnected. Additionally, the control of the twist of a double jacketed fire hose is important so as to prevent personnel injury. A large twist on a double jacketed fire hose could cause the hose to injure a firefighter if, for example, he/she were holding it.

The untwisting is performed by the simulation of pressure inside the inner jacket 1. The first drive means 10 pulls the inner jacket 1 over the pilot 13 under tension.

The untwisted inner jacket 1 is collected in the first reservoir 33. Control means control and sequence the first and second drive and the first and second clamping means. When a sufficient length of inner jacket 1 is collected in the first reservoir 33, the first clamping means is clamped and the second clamping means is unclamped and the inner jacket is pulled through the second clamping station by the second drive means 11. The second drive means 11 continues to pull the inner jacket over the second clamping means until a sufficient length is collected in second reservoir 35. The reservoirs 33 and 35 are collection areas where the inner jacket is bunched up, or stored, for further processing.

The inner jacket 1 is then heated and dried. The heating and drying means employed in the preferred embodiment is a high velocity hot air unit 12. However, it is envisioned that any heating means could be used in place of a high velocity hot air unit. The heating and drying is performed prior to the coating and encapsulation of the inner jacket 1 with polyurethane 9. It has been found that the polyurethane 9 adheres to the warp and weft fibers of the inner jacket and encapsulates them more effectively when the inner jacket has been thoroughly dried and preheated.

The polyurethane liner of the present invention does not detach. The liner does not detach for several reasons. First the heating and drying of the inner jacket prior to entering the cross head extruding die where the polyurethane is extruded enables complete encapsulation of the polyurethane to the warp and weft fibers. The heating and drying is necessary because the manufacturing environment is frequently humid. On days of high relative humidity, sufficient moisture in the air interferes with the adhesion of the polyurethane to the warp and weft fibers. Additionally, the heating of the inner jacket elevates the temperature of the warp and weft fibers such that there is a smaller temperature gradient between the polyurethane and the fibers. This results in 100% adhesion. The polyurethane is applied at approximately 400 to 450 degrees F.

The inner jacket is then drawn over a mandrel and through the cross head extruding die where polyurethane is extruded onto and into the inner jacket 1 encapsulating it with polyurethane. The inner jacket 1 is not under tension before it enters the cross head extruding die. Tension on the inner jacket 1 is created as it is drawn over the mandrel and through the die and wiper. After polyurethane is extruded onto, into and through the inner jacket 1, the inner jacket 1 passes through a cooling tank where the inner jacket is sprayed with water. In the preferred embodiment, the water is sprayed in the form of a mist.

Figure 6:
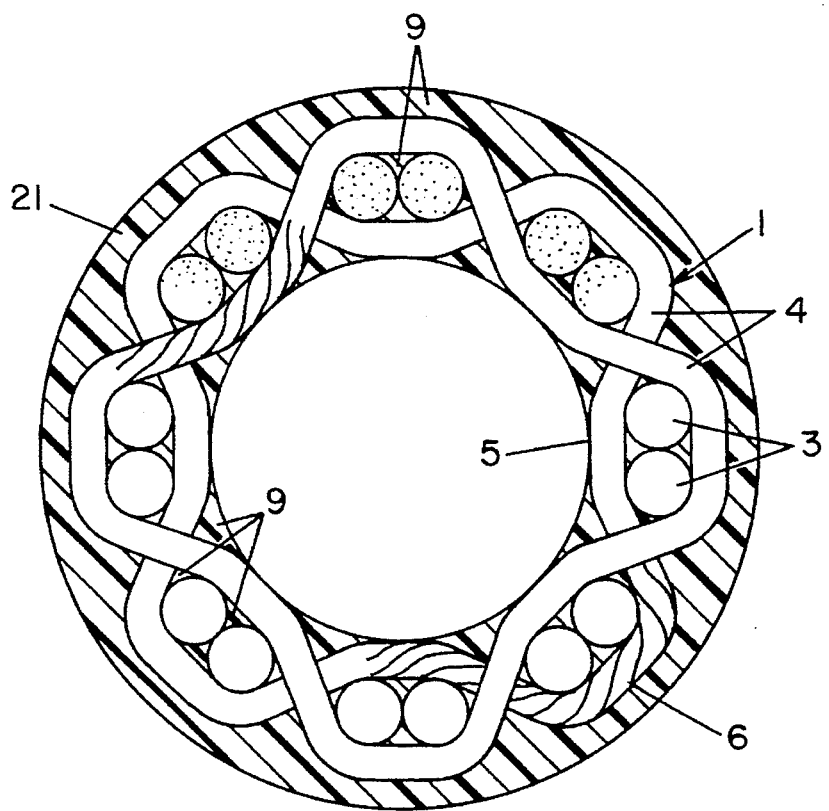
FIG. 6 illustrates the warp and weft fibers of the inner jacket together with a layer of polyurethane on the exterior surface of the inner jacket.

There are two different mandrels that are used for this step of the process. For hose sizes of two inches and smaller, a pipe-like mandrel shown in FIG. 3 is employed. When the inner jacket 1 is drawn over the pipe-like mandrel 30 and through the die 19 and wiper 42, a layer 21 of polyurethane is extruded onto the exterior 6 of the inner jacket and, additionally, the polyurethane encapsulates the warp and weft fibers of the inner jacket. The resultant layer 21 and encapsulation of the warp and weft fibers of the inner jacket is shown in FIG. 6. FIG. 6 illustrates the exterior layer 21 as well as the complete encapsulation of the warp and weft fibers. The inner jacket 1 is drawn over the mandrel and through the die and the wiper under tension by a third drive means 39. This process causes a slight elongation of the inner jacket 1. Additionally, this process causes a slight reduction in the diameter of the inner jacket 1.

Figure 7:
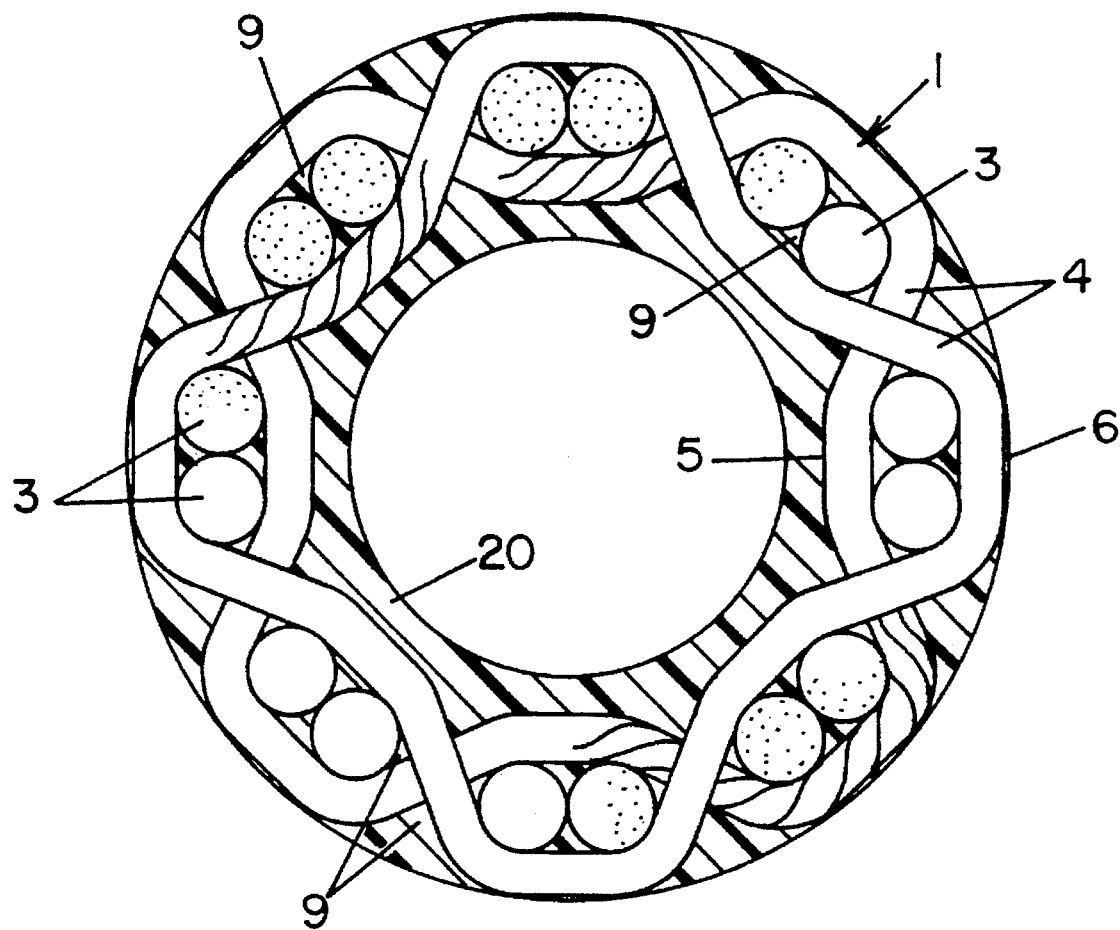
FIG. 7 illustrates a layer of polyurethane similar to that of FIG. 6 except the smooth layer of polyurethane resides on the interior of the inner jacket and was applied using mandrel 14 and wiper 18.

For inner jackets having a diameter larger than two inches, a perforated mandrel 14 and a variation of the polyurethane extrusion process is employed in the preferred embodiment. Specifically, the mandrel as shown in FIG. 4 is employed. The mandrel of FIG. 4 in combination with the die 19 and wiper 18 extrudes a layer 20 of polyurethane on the interior 5 of the inner jacket 1. FIG. 7 illustrates the layer 20 of polyurethane on the interior 5 of the inner jacket 1 as well as a complete encapsulation of the warp 3 and weft 4 fibers of the inner jacket 1. FIG. 7 shows a layer 20 of polyurethane on the interior of the inner jacket.

FIG. 4 is an enlarged cross-sectional view of the mandrel 14 and die 19 used to extrude the polyurethane 9 onto, into and through the inner jacket 1 to form a polyurethane layer 20 on the interior 5 of the inner jacket 1. Mandrel 14 has an outer sheath 31. The outer sheath 31 has several apertures 15 which permit the flow of polyurethane through the outer sheath and into a chamber 16 in the mandrel 14. The chamber 16 is connected to additional chambers 16a and 16b through passageways 17 and 17a. These additional passageways and chambers form a smooth layer 20 of polyurethane on the interior of the inner jacket. The second drive means 11 pulls the inner jacket 1 over the mandrel 14 and through the die 19 and wiper 18 under tension. The resultant effect of this process is to slightly elongate the inner jacket 1 and to reduce the diameter of the inner jacket 1.

Figure 8:
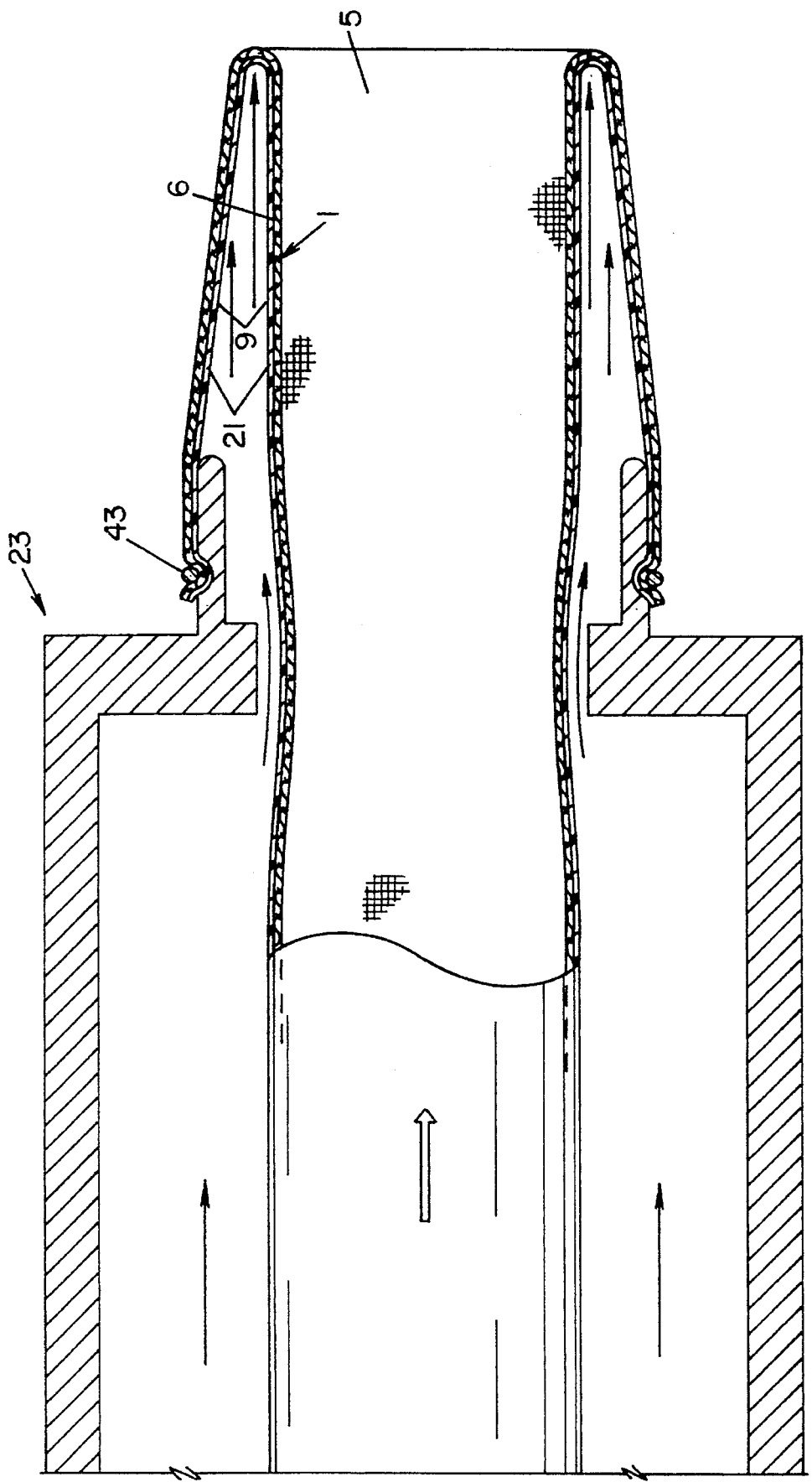
FIG. 8 is a schematic cross-sectional view of the reversing process shown together with the inner jacket.

For inner jackets having a size of two inches or less, the polyurethane is applied using the mandrel 30 so as to create a smooth layer 21 of polyurethane on the exterior of the inner jacket. However, inner jackets having a diameter of less than or equal to two inches, are reversed through a reversing step of the process. FIG. 8 illustrates the reversing process in a schematic fashion.

It is desired that the final construction of the double jacketed fire hose 28 have a smooth layer of polyurethane on the interior of the inner jacket. Inner jackets having diameters less than or equal to two inches, initially have a smooth layer of polyurethane applied to the exterior of the inner jacket as shown in FIG. 6. The smooth layer 21 of polyurethane is extruded onto the exterior of the inner jacket as shown in FIG. 6 because it has been found that flexibility of the inner jacket 1 can be maintained and controlled more precisely in this manner. Specifically, to extrude polyurethane onto, into, through and on the interior of the inner jacket using mandrel 14, the warp and weft fibers must be sufficiently large enough so as to permit adequate polyurethane flow area through said inner jacket.

The flow area through the fabric of an inner jacket is dependent upon the size of the yarn used in constructing the inner jacket. If coarse, heavy yarn is used then a large flow area is created. If smaller, thinner yarn is employed then the inner jacket is more flexible but the flow area is decreased. Generally, the larger the diameter size, the larger the yarn used to make the jacket. Flow of polyurethane through the inner jacket 1 and the outer sheath 31 on the mandrel is necessary so as to extrude a layer of polyurethane on the interior 5 of the inner jacket 1. The preferred embodiment of the present invention includes the use of the pipe-like mandrel 30 and the extruding method used therewith resulting in a smooth layer 21 of polyurethane on the exterior of the inner jacket 1 for small sized hose. The inner jacket is then reversed as shown schematically in FIG. 8 for inner jackets having a diameter of two inches or less. By reversing, it is meant that the inner jacket 1 is simply turned inside out. This results in a smooth layer of polyurethane residing on what is now the interior of the inner jacket. Further in that this process permits the construction of the inner jacket 1 using warp 3 and weft 4 fibers of lighter construction, the flexibility of the double jacketed fire hoses having a diameter of two inches or less is maintained. This enables the compact packing of these double jacketed fire hoses.

FIG. 8 illustrates, schematically, the reversing process. The reversing process is quite simple. One end of the inner jacket is clamped with clamp 43 and air pressure is applied as shown by the directional arrows in FIG. 8 which results in the inner jacket being reversed, or put another way, turned inside out. It should be noted that the reversing process is necessary to maintain flexibility of the double jacketed fire hoses having diameters of two inches or less. However, the process employing mandrel 14 could be used for double jacketed fire hoses having diameters of two inches or less provided, that warp and weft fibers of sufficient size are used in the construction of the inner jacket.

Reversing is not necessary nor desired on inner jackets having diameters greater than two inches. Mandrel 14 is employed in the preferred embodiment of the extrusion process on inner jackets having diameters greater than two inches.

For hoses having diameters larger than 2 inches, the preferred embodiment of the process entails extruding a layer of polyurethane interiorly using mandrel 14. However, mandrel 30 could be used for hoses having diameters larger than 2 inches for extruding a layer of polyurethane exteriorly. If this is done, however, reversing would be necessary.

The function of polyurethane layers 20, 21 is to provide a smooth surface for water flow within the hose. See, FIG.

10 which illustrates the completed construction of the double jacketed fire hose 28 with polyurethane layers 20, 21 providing a smooth, low friction, surface for water flow. FIG. 10 illustrates the construction of the double jacketed fire hose for all hoses regardless of diameter size. For hoses having diameters of two inches or less, FIG. 10 illustrates polyurethane layer 21, the inner jacket 1 having been reversed, providing a smooth surface for water flow within the hose. For hoses having diameters greater than two inches, FIG. 10 illustrates polyurethane layer 20 providing a smooth surface for water flow within the hose.

Figure 9:
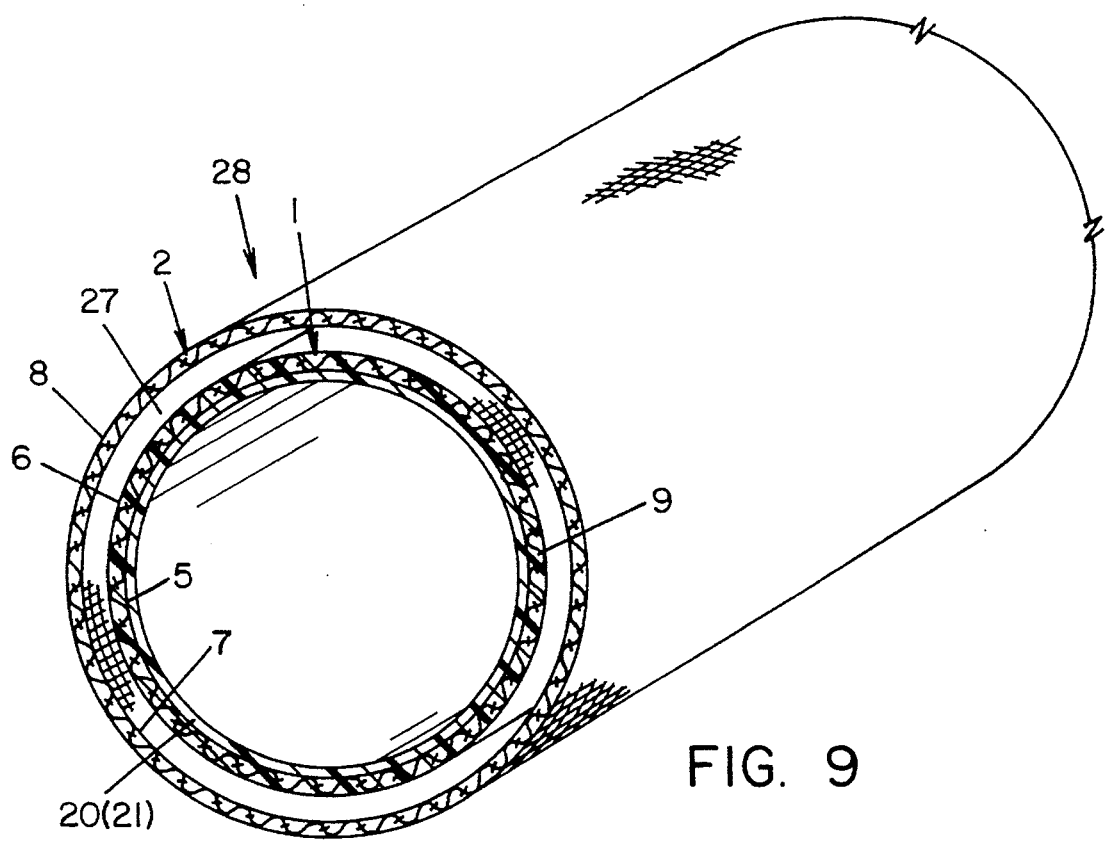
FIG. 9 is a view of the inner jacket assembled inside the outer jacket before normalization.

FIG. 9 is a cross-sectional view of the inner jacket 1, the outer jacket 2, and the interior layer 20 of polyurethane. The cross-sectional view of FIG. 9 does not show the warp and weft fibers of the inner and outer jackets. Rather, FIG. 9 illustrates the air gap 27 between the inner jacket and the outer jackets that exists after the inner jacket has been inserted into the outer jacket but before normalization. FIG. 9 also shows the polyurethane layers 20, 21 on the interior of the jacket. FIG. 9 illustrates the double jacketed fire hose 28 prior to the normalization process which is described hereinbelow.

Figure 11:
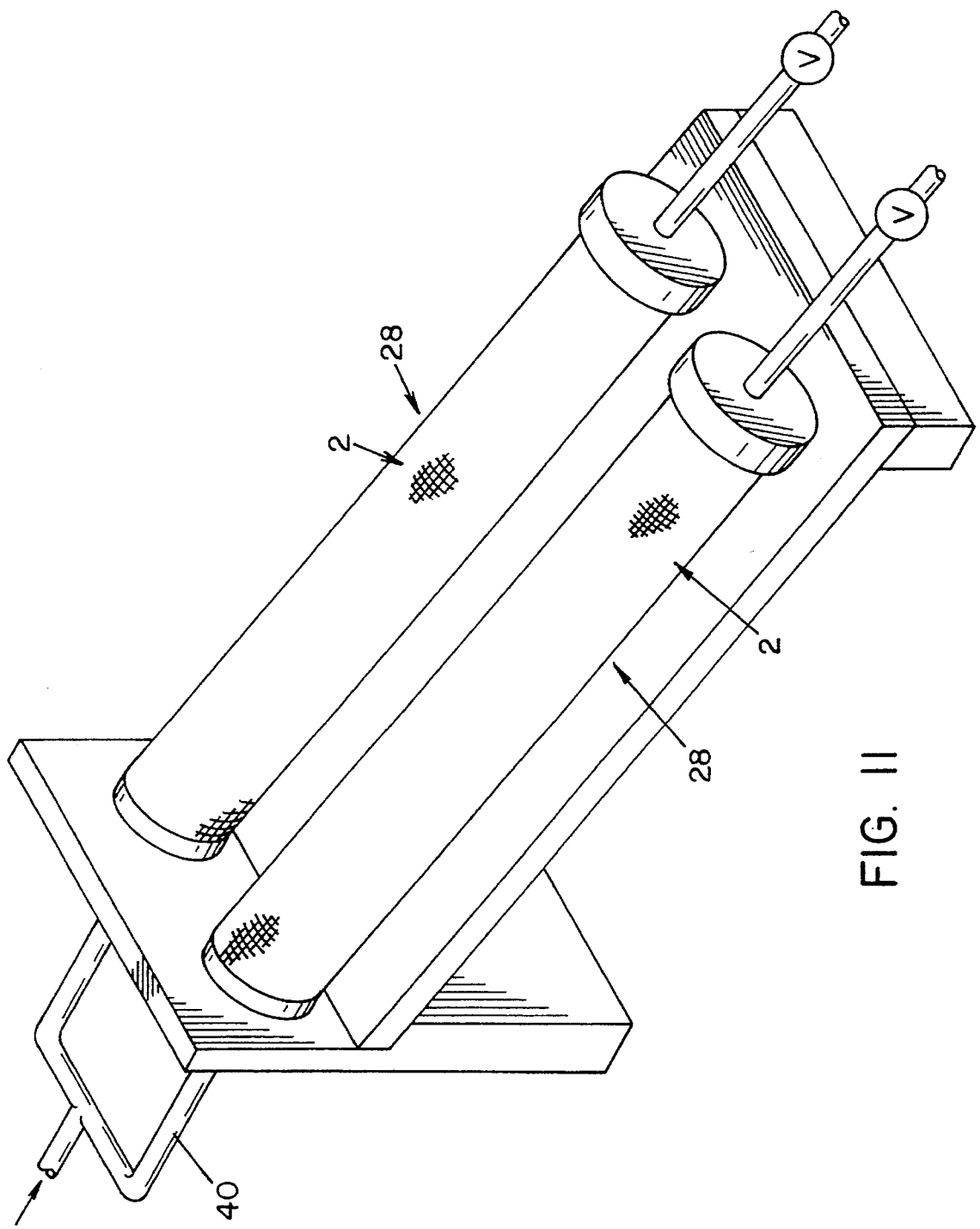
FIG. 11 is a schematic of the normalization process.

FIG. 11 illustrates the double jacketed fire hose 28 and the hardware necessary to perform the normalization. The normalizing processes occurs after the inner jacket 1 has been inserted into the outer jacket 2. The inner and outer jackets assembled together are then placed on a sloped table. FIG. 11 shows schematically the hardware used in the normalizing process as well as the sloped table. In the normalization process saturated steam at 285 degrees F., more or less, is applied to the interior of the inner jacket. Both ends of the double jacketed fire hose are clamped as shown in FIG. 11 and any condensate formed is permitted to drain at the lower end. The saturated steam at the aforementioned conditions is applied for approximately four to five minutes and then the double jacketed hose is allowed to cool.

Steam is applied under various conditions and for various lengths of time depending upon the initial fit of the inner jacket with respect to the outer jacket. For instance, if the initial fit of the inner jacket with respect to the outer jacket is relatively tight then the steam does not have to be applied quite-so long. Conversely, if the initial fit is relatively loose then steam may have to be applied for a longer period of time.

The normalizing process has the effect of removing the slight elongation of the inner jacket which occurred in the process previously. Further the normalizing process restores the inner jacket to its approximate original diameter and fits the inner jacket into snug engagement with the outer jacket. Specifically, the exterior 6 of the inner jacket resides in snug engagement with the interior 7 of the outer jacket as shown in FIG. 10. The air gap is eliminated in the normalizing process. The air escapes through the outer jacket; or, more particularly, through the spaces between the warp and weft fibers of the outer jacket. Additionally, the normalizing process shrinks the outer jacket to fit the inner jacket. It has been found that the normalization process has the effect of shrinking the outer jacket. This preshrinking promotes dimensional stability when, for example, the double jacketed hose is used in the field and gets wet.

The normalizing process maintains the untwisting which was effected earlier as previously described. The resultant double jacketed fire hose 28 is one which acts as a unified hose and which does not twist in an undesirable fashion. Additionally, the double jacketed fire hose is one which packs easily and in a minimum amount of space. The double jacketed fire hose also has a smooth layer of polyurethane on the interior of the jacket which results in very little friction and hence very little pressure loss in service. Additionally, the polyurethane liner of the present invention does not detach. Additionally, there is no kinking and/or bunching up of the inner jacket.

While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A method for manufacturing a fire hose having an inner woven jacket and an outer woven jacket, each having a twist imparted thereto during weaving, comprising the steps of untwisting said twisted inner woven jacket such that the remaining twist, if any, is small relative to the twist imparted during weaving, heating and drying said untwisted inner woven jacket, extruding a thermoplastic material onto, into, and through said untwisted inner woven jacket, cooling said untwisted inner woven jacket, inserting said inner woven jacket into said a twisted outer woven jacket, and pressurizing and heating said untwisted inner and said twisted outer woven jackets.

2. A method for manufacturing a fire hose having an inner woven and outer woven jacket, each having a twist imparted thereto during weaving, comprising the steps of untwisting said twisted inner woven jacket such that the remaining twist, if any, is small relative to the twist imparted during weaving, heating and drying said untwisted inner woven jacket, extruding polyurethane onto, into and through said untwisted inner woven jacket, inserting said untwisted inner woven jacket into said twisted outer woven jacket, and pressurizing and heating said untwisted inner woven jacket.

3. A method for manufacturing a fire hose having an inner woven jacket and an outer woven jacket, each having a twist imparted thereto during weaving, comprising the steps of untwisting said twisted inner woven jacket such that the remaining twist, if any, is small relative to the twist imparted during weaving, heating and drying said untwisted inner woven jacket, extruding polyurethane onto, into, and through said untwisted inner woven jacket, cooling said untwisted inner woven jacket, inserting said untwisted inner woven jacket into said twisted outer woven jacket, and pressurizing and heating said untwisted inner woven jacket and said twisted outer woven jacket.

4. A method for manufacturing a fire hose having an inner woven jacket and an outer woven jacket as claimed in claim 3 wherein said step of heating and drying said untwisted inner woven jacket includes removing moisture from said untwisted inner woven jacket.

5. A method for manufacturing a fire hose having an inner woven jacket and an outer woven jacket as claimed in claim 4 wherein said step of pressurizing and heating said untwisted inner woven jacket and said twisted outer woven jacket is performed with steam.

6. A method for manufacturing a fire hose having an inner woven jacket and an outer woven jacket as claimed in claim 5 wherein said untwisted inner woven jacket includes an interior and an exterior and wherein said step of extruding polyurethane onto, into, and through said untwisted inner woven jacket includes extruding a smooth layer of polyurethane on said interior of said untwisted inner woven jacket.

7. A method for manufacturing a fire hose having an inner woven jacket and an outer woven jacket as claimed in claim 5 wherein said untwisted inner woven jacket includes an interior and an exterior and wherein said step of extruding polyurethane onto, into, and through said untwisted inner woven jacket includes extruding a smooth layer of polyurethane on said exterior of said untwisted inner woven jacket.

8. A method for manufacturing a fire hose having an inner woven jacket and an outer woven jacket as claimed in claim 7 wherein said method includes an additional step of reversing said untwisted inner woven jacket before inserting said untwisted inner jacket into said twisted outer woven jacket.

9. A method for manufacturing a fire hose having an inner woven jacket and an outer woven jacket as claimed in claim 5 wherein said method includes an additional step of reversing said untwisted inner woven jacket before inserting said untwisted inner woven jacket into said twisted outer woven jacket.

10. A method for manufacturing a fire hose having an inner jacket and an outer jacket comprising the steps of weaving an inner jacket imparting a twist thereto, weaving an outer jacket imparting a twist thereto, untwisting said inner jacket such that the remaining twist, if any, is small relative to the twist imparted during weaving, heating and drying said untwisted inner jacket, extruding polyurethane onto, into, and through said untwisted inner jacket, cooling said untwisted inner jacket, inserting said untwisted inner jacket into said twisted outer jacket, and pressurizing and heating said untwisted inner jacket.

11. A method for manufacturing a fire hose having an inner and outer jacket as claimed in claim 10 wherein said method includes an additional step of reversing said untwisted inner jacket before inserting said untwisted inner jacket into said twisted outer jacket.

12. A method for manufacturing a fire hose having an inner jacket and an outer jacket as claimed in claim 11 wherein said step of heating and drying said untwisted inner jacket includes removing moisture from said untwisted inner jacket.

13. A method for manufacturing a fire hose having an inner and outer jacket as claimed in claim 12 wherein said step of pressurizing said untwisted inner jacket is performed with steam.

14. A method for manufacturing a fire hose having an inner and outer jacket employing a loom to weave said inner and outer jackets, a pilot for untwisting said inner jacket such that the remaining twist, if any, is small relative to the twist imparted during weaving, a first clamping means and a second clamping means, a first inner jacket reservoir and a second inner jacket reservoir, a first drive means for pulling said inner jacket over said pilot and said first clamping means and into said first reservoir, a heating means for preheating and drying said inner jacket, polyurethane, a second drive means for pulling said inner jacket over said second clamping station and into said second reservoir, a cross head extruding die, a wiper and a mandrel for extruding polyurethane onto and into said inner jacket encapsulating said inner jacket with said polyurethane, a cooling tank, a third drive means for pulling said inner jacket through said heating means, over said mandrel and through said die and said cooling tank, a sloped table for assembling said inner jacket within said outer jacket and pressurizing said inner jacket with steam, said method comprising the steps of weaving an inner jacket on a loom and imparting a twist thereto, weaving an outer jacket on a loom imparting a twist thereto, untwisting said inner jacket by pulling said inner jacket over said pilot with said first drive means, heating and drying said untwisted inner jacket with said heating means, pulling said untwisted inner jacket over said mandrel, through said die, wiper and said cooling tank with said third drive means, extruding polyurethane onto and into said untwisted inner jacket, inserting said untwisted inner jacket into said outer jacket, placing said untwisted inner and said twisted outer jackets assembled together on a sloped table, pressurizing said untwisted inner jacket with steam, and, cooling said untwisted inner and said twisted outer jackets.

15. A method for manufacturing a fire hose having an inner and outer jacket as claimed in claim 14 wherein said untwisted inner jacket includes warp and weft fibers and wherein said step of extruding polyurethane onto and into said untwisted inner jacket completely encapsulates said warp and weft fibers of said untwisted inner jacket.

16. A method for manufacturing a fire hose having an inner and outer jacket as claimed in claim 15 wherein said untwisted inner jacket includes an exterior and an interior, said step of extruding polyurethane includes extruding a smooth layer of polyurethane on said exterior of said untwisted inner jacket.

17. A method for manufacturing a fire hose having an inner and outer jacket as claimed in claim 16 wherein said method includes an additional step of reversing said untwisted inner jacket before inserting said untwisted inner jacket into said twisted outer jacket.

18. A method for manufacturing a fire hose having an inner and outer jacket as claimed in claim 15 wherein said untwisted inner jacket includes an exterior and an interior, and said step of extruding polyurethane includes extruding a smooth layer of polyurethane on said interior of said untwisted inner jacket.

19. A method for manufacturing a fire hose having an inner and outer jacket as claimed in claim 15 wherein said step of untwisting said inner jacket includes applying pressure to said warp and weft fibers of said untwisted inner jacket.

20. A method for manufacturing a fire hose having an inner and outer jacket as claimed in claim 19 wherein said step of untwisting said inner jacket is controlled by regulating said pressure being applied to said warp and weft fibers.

21. A method for manufacturing a fire hose having an inner and outer jacket employing a loom to weave said inner and outer jackets, said inner jacket having warp and weft fibers, said outer jacket having warp and weft fibers, a pilot for untwisting said inner jacket such that the remaining mist, if any, is small relative to the twist imparted during weaving, a first and a second clamping station, a first and a second inner jacket reservoir, said inner jacket having an interior and an exterior, a first drive means for pulling said inner jacket over said pilot and through said first clamping station and into said first reservoir, a heating means for drying and preheating said inner jacket, polyurethane, a second drive means for pulling said inner jacket over said clamping station and into said second reservoir, a cross head extruding die, wiper and a mandrel for extruding polyurethane onto and into said inner jacket encapsulating said inner jacket with said polyurethane, a cooling tank, a third drive means for pulling said inner jacket over said mandrel, through said die, wiper and said cooling tank, a sloped table for assembling said inner jacket within said outer jacket and pressurizing said inner jacket with steam, said method comprising the steps of weaving an inner jacket on a loom imparting therein a rotational twist, weaving an outer jacket on a loom imparting therein a rotational twist in a direction opposite said rotational twist of said inner jacket, untwisting said inner jacket by pulling said inner jacket under tension over said pilot with said first drive means, heating and drying said untwisted inner jacket with said heating means, pulling said untwisted inner jacket under tension over said mandrel, through said die, wiper and said cooling tank with said third drive means, extruding polyurethane onto and through said untwisted inner jacket forming a smooth layer on said interior of said untwisted inner jacket, cooling said untwisted inner jacket, inserting said untwisted inner jacket into said outer jacket, placing said untwisted inner and said twisted outer jackets assembled together on a sloped table, pressurizing said untwisted inner jacket with steam, cooling said untwisted inner and said twisted outer jackets while under pressure, and orienting said untwisted inner jacket with respect to said twisted outer jacket.

* * * * *

UNITED STATES PATENT AND TRADEMARK OFFICE
CERTIFICATE OF CORRECTION

PATENT NO. : 5,593,527
DATED : January 14, 1997
INVENTOR(S) : Josef B. Schomaker, et al.

It is certified that error appears in the above-indentified patent and that said Letters Patent is hereby corrected as shown below:

Column 2, line 5, delete "dot", and insert -- not --.

Column 4, line 16, after "of", insert -- an --.

Column 10, line 24, after "said", delete "a".

Column 12, line 46, delete "mist", and insert
    -- twist --.
TITLE PAGE, Inventor Michael Kirjk is misspelled, should read -- Michael Kirik, Jr. --

Signed and Sealed this

First Day of April, 1997

Attest:

BRUCE LEHMAN

Attesting Officer

Commissioner of Patents and Trademarks